United States Patent [19]

Larikka

[11] Patent Number: 4,948,101

[45] Date of Patent: Aug. 14, 1990

[54] APPARATUS FOR MAKING DIVERGENT CUTS CHAMFERED RELATIVE TO A CUTTING SURFACE BY MEANS OF TORCH CUTTING

[76] Inventor: Leo Larikka, Takkatie 7a,, 00370 Helsinki, Finland

[21] Appl. No.: 360,895

[22] PCT Filed: Dec. 7, 1987

[86] PCT No.: PCT/FI87/00161
§ 371 Date: May 26, 1989
§ 102(e) Date: May 26, 1989

[87] PCT Pub. No.: WO88/04212
PCT Pub. Date: Jun. 16, 1988

[30] Foreign Application Priority Data
Dec. 8, 1986 [FI] Finland .................................. 864980

[51] Int. Cl.⁵ .............................................. B23K 7/04
[52] U.S. Cl. .......................................... 266/55; 266/48
[58] Field of Search .................................. 266/48, 55

[56] References Cited

U.S. PATENT DOCUMENTS

| | | | |
|---|---|---|---|
| 1,692,924 | 11/1928 | Brown | 266/55 |
| 4,162,383 | 7/1979 | Hamasaki | 266/55 |
| 4,667,936 | 5/1987 | Hale, Jr. | 266/55 |

Primary Examiner—S. Kastler
Attorney, Agent, or Firm—Marshall & Melhorn

[57] ABSTRACT

The invention relates to an apparatus for making divergent cuts chamfered relative to a cutting surface, e.g. welding chamfers, by means of torch cutting particularly in the internal cutting of cylindrical sheets, such as pipes. The apparatus comprises a torch (8) mounted on a fastening arm (2) at the end of a carrier arm (1), said carrier arm (1) being axially movable and rotatable around its axis. The fastening arm (2) at the end of carrier arm (1) is fitted with a transverse support arc (3), which carries an element (4) movable along an arcuate path and fitted with a longitudinal support arc (5), the latter carrying a mounting plate (6) for torch (8), the plate being movable along an arcuate path. The radii of the arcuate paths of support arcs (3, 5) are equal and their centers are equally far from the center line of carrier arm (1) at an axial distance from each other.

6 Claims, 2 Drawing Sheets

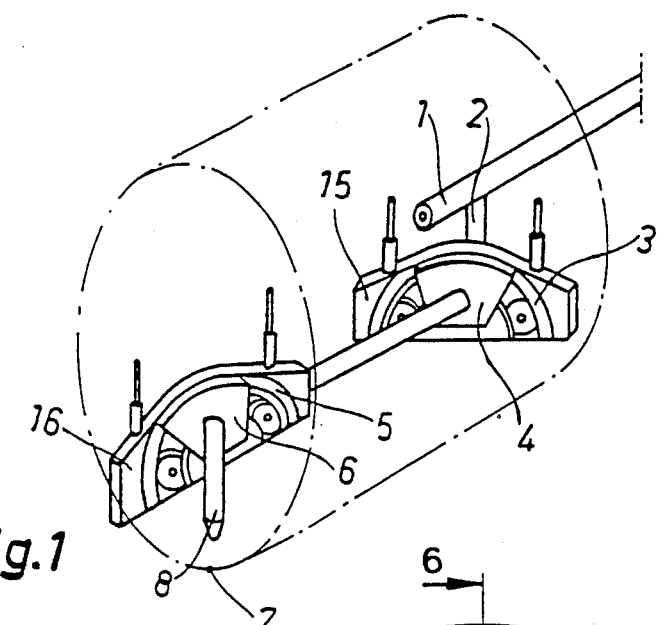
Fig. 1
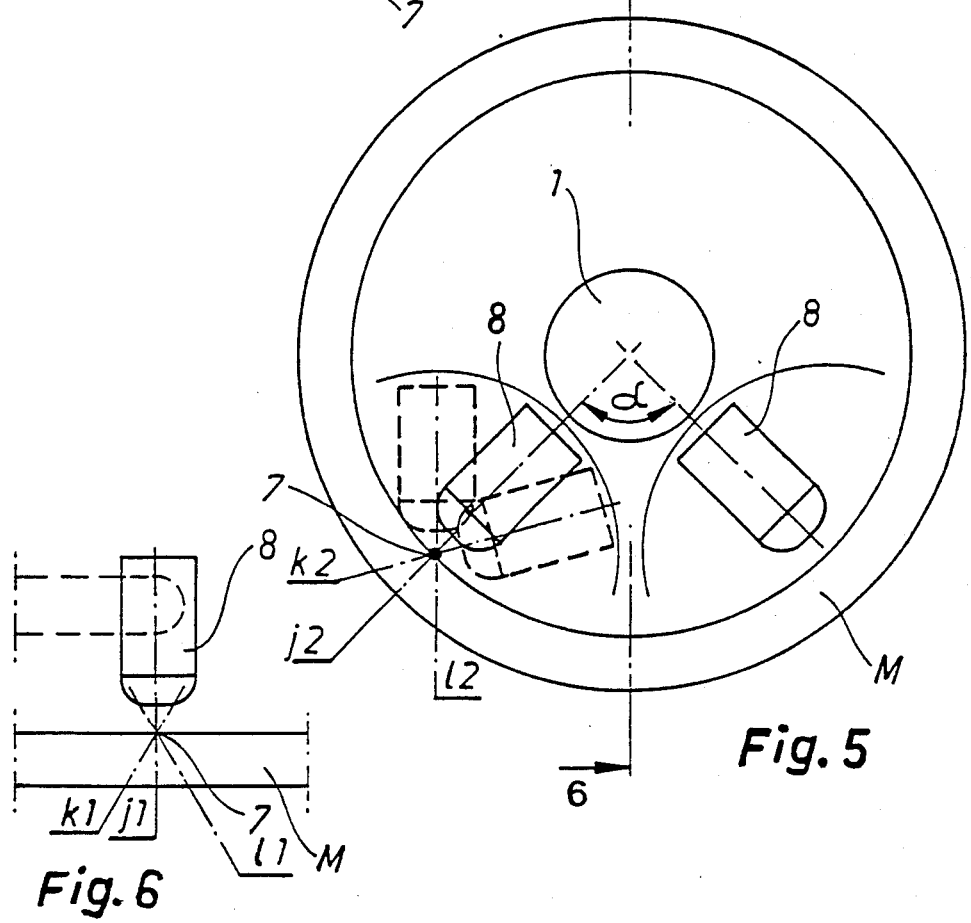
Fig. 5
Fig. 6

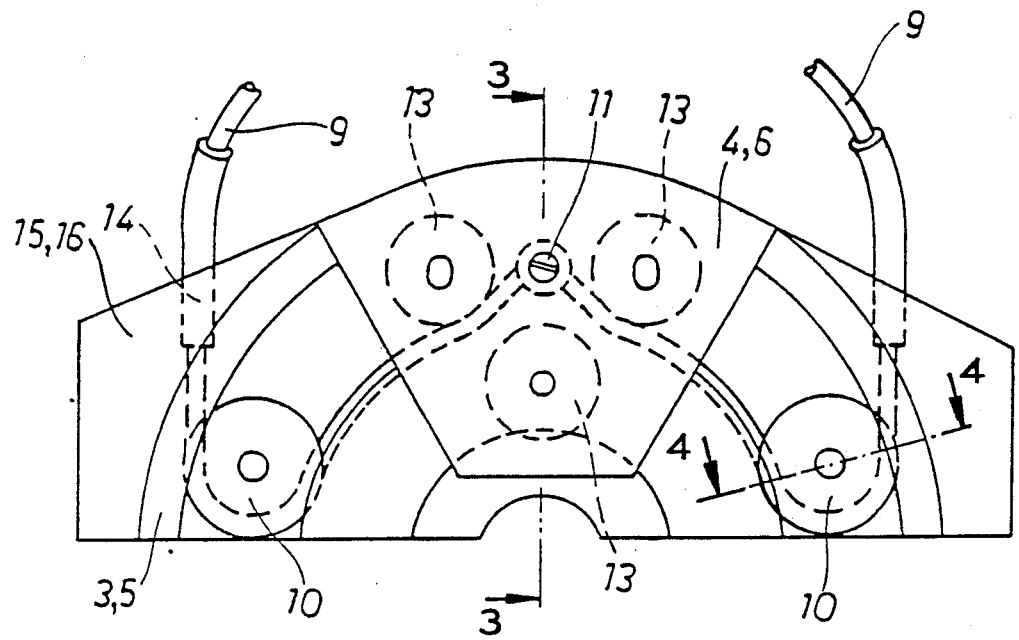
Fig. 2
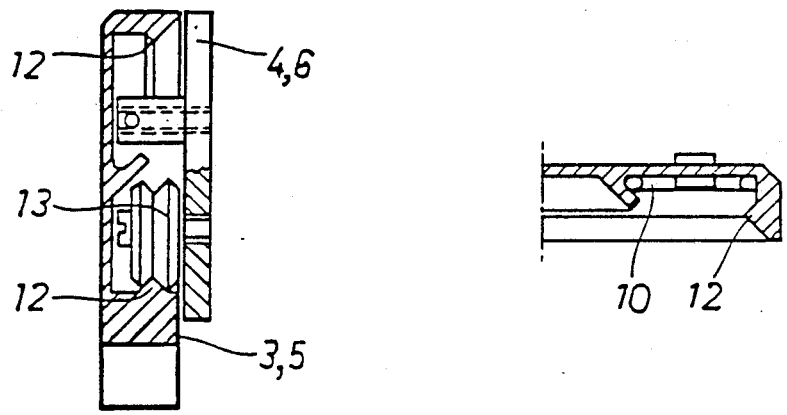
Fig. 3
Fig. 4

APPARATUS FOR MAKING DIVERGENT CUTS CHAMFERED RELATIVE TO A CUTTING SURFACE BY MEANS OF TORCH CUTTING

The present invention relates to an apparatus for making divergent cuts chamfered relative to a cutting surface, e.g. welding chamfers, by means of torch cutting, especially in the internal cutting of cylindrical sheets, such as pipes.

In industrial manufacturing, the cutting of pieces, the removal of pieces from a sheet, the cutting off of profiled irons and pipes and like require not only the cutting but also a chamfer for welding. There are several different means and devices for producing chamfers in free space but those cannot be applied to the internal cutting of rather small pipes by using a cutting torch guide disclosed in Patent application WO86/04003. According to its operating principle, this prior art cutting torch guide carries a torch along the internal wall of a cylindrical jacket at a set working distance from the wall.

An object of the invention is to provide an apparatus for varying the inclination of the cutting direction of the burner head of a cutting torch while the path of the tip portion of said burner head follows a desired cutting line.

This object is achieved by means an apparatus of for making divergent cuts chamfered relative to a cutting surface by means of torch cutting in the internal cutting of cylindrical sheets. The apparatus includes a torch mounted on a fastening arm at the end of a carrier arm, the carrier arm being adapted to be axially movable and rotatable around its axis. The fastening arm at the end of the carrier arm is fitted with a transverse support arc provided with an element movable along an arcuate path and fitted with a longitudinal support arc which is provided with a mounting plate for the torch. The mounting plate is movable along an arcuate path whereby the radii of the arcuate paths of the support arcs are equal and their centers are equally far from the center line of the carrier arm at an axial distance from each other.

The invention will now be described in more detail with reference made to the accompanying drawings, in which FIG. 1 shows an apparatus of the invention in a schematic perspective view, FIG. 2 shows a structural component of the apparatus of FIG. 1 as seen from the front, FIG. 3 is a section of the structural component of FIG. 2 along a line 3—3, FIG. 4 is a section of the structural component of FIG. 2 along a line 4—4, FIG. 5 illustrates an application of the invention to the cutting of a cylindrical surface, and FIG. 6 shows a section through FIG. 5 along a line 6—6.

As shown in FIG. 1, the apparatus of the invention comprises a block 15 secured to a fastening arm 2 at that end of a carrier arm 1 which is closer to a torch 8, said block 15 being fitted with a transverse support arc 3 provided with an element 4 traveling along an arcuate path. To said moving element 4 is secured a block 16 fitted with a longitudinal support arc 5 provided with a mounting plate 6 for a torch 8, said plate traveling along an arcuate path. The radii of the arcuate paths of support arcs 3, 5 are equal and their centers are equally far from the center line of carrier arm 1 at an axial distance from each other.

The traveling path of moving element 4 runs preferably in the same direction as the rim of transverse support arc 3, the plane of said traveling path being perpendicular to the center line of the carrier arm. On the other hand, the traveling path of moving mounting plate 6 runs preferably in the same direction as the rim of longitudinal support arc 5, the plane of this traveling path being parallel to the vertical plane of carrier arm 1.

The moving element 4 and the moving mounting plate 6 each has its own shifting mechanism, whereby said moving elements 4, 6 can be independently adjusted. The shifting mechanisms are both identical, comprising a driving cable 9, a driving cable inlet 14, driving cable reversing wheels 10, a driving cable fastening means 11 for securing the driving cable to moving element 4, 6, as well as guide tracks 12 with their guide wheels 13 (FIGS. 2–4).

In one preferred embodiment of an apparatus of the invention, a drive means (not shown) for driving cable 9 is mounted on the end of carrier arm 1 away from the torch, so that said driving cable 9 extends inside a hollow carrier arm 1.

The moving element 4, 6 is preferably mounted with three guide wheels 13 so as to be movable between V-tracks 12. When driving cable 9 is driven in a desired direction by means of said drive means, said moving element 4, 6 swings accordingly through the intermediary of locking means 11. By combining the movements of moving elements 4, 6, the traveling path of torch 8 can be as desired.

The support arcs 3 and 5 are normally positioned in a manner that said torch 8 is perpendicular to the surface to be cut. In cutting a cylindrical surface, as shown in FIG. 5, so that the carrier arm 1 of a cutting torch guide disclosed in the above-cited Patent application WO86/04003 turns through an angle $\alpha$, said cutting torch 8 remains all the time perpendicular to the wall of a cylinder M. A position different from the perpendicular position, as e.g. line $k_2$ or $l_2$, is obtained by turning said moving element 4 by means of the shifting mechanism in a desired direction, whereby the support arc 5 secured thereto turns accordingly and causes said torch 8 to turn relative to a perpendicular line $j_2$ while the intersection 7 remains the same.

In the section, 6—6 of FIG. 6, there is shown the position of torch 8 in the plane of the longitudinal axis of a carrier arm. A desired chamfer angle, e.g. along lines $k_1$ or $m_1$, is obtained by turning said moving mounting plate 6 by means of the shifting mechanism to a desired position, whereby said torch 8 turns in the plane of the longitudinal axis of carrier arm 1 around intersection 7.

The above-described embodiments are not intended to limit but only to clarify an inventive idea set forth in the annexed claims.

I claim:

1. An apparatus for making divergent cuts chamfered relative to a cutting surface by means of torch cutting in the internal cutting of cylindrical sheets, said apparatus comprising a torch (8) mounted on a fastening arm (2) at the end of a carrier arm (1), said carrier arm (1) being adapted to be axially movable and rotatable around it axis, wherein the fastening arm (2) at the end of the carrier arm (1) is fitted with a transverse support arc (3) provided with an element (4) movable along an arcuate path and fitted with a longitudinal support arc (5), the latter being provided with a mounting plate (6) for torch (8), said mounting plate being movable along an arcuate path, whereby the radii of the arcuate paths of support arcs (3, 5) are equal and their centers are equally distance from each other.

2. An apparatus as set forth in claim 1, wherein the traveling path of moving element (4) runs in the same direction as the rim of transverse support arc (3), the plane of said traveling path being perpendicular to the center line of carrier arm (1).

3. An apparatus as set forth in claim 1, wherein the traveling path of moving mounting plate (6) runs in the same direction as the rim of longitudinal support arc (5), the plane of said traveling path being perpendicular to the plane of the traveling path of moving element (4).

4. An apparatus as set forth in claim 1, wherein said moving element (4) and moving mounting plate (6) are provided with separate shifting mechanisms, said moving elements (4, 6) being independently movable.

5. An apparatus as set forth in claim 4, wherein the shifting mechanism for said moving element (4, 6) comprises a driving cable (9), a driving cable inlet (14), driving cable reversing wheels (10), a driving cable fastening means (11) for fastening the driving cable to moving element (4, 6), as well as guide tracks (12) with their guide wheels (13).

6. An apparatus as set forth in claim 5, wherein in that the drive means for driving cable (9) is mounted on the end of carrier arm (1) away from the torch, said driving cable (9) running inside a hollow carrier arm (1).

* * * * *